United States Patent
Rising

(10) Patent No.: US 7,239,750 B2
(45) Date of Patent: Jul. 3, 2007

(54) SYSTEM AND METHOD FOR EFFECTIVELY UTILIZING UNIVERSAL FEATURE DETECTORS

(75) Inventor: Hawley K. Rising, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 753 days.

(21) Appl. No.: 10/317,559

(22) Filed: Dec. 12, 2002

(65) Prior Publication Data

US 2003/0135289 A1    Jul. 17, 2003

Related U.S. Application Data

(60) Provisional application No. 60/340,382, filed on Dec. 12, 2001.

(51) Int. Cl.
*G06K 9/66* (2006.01)
(52) U.S. Cl. ..................................... 382/190
(58) Field of Classification Search ................ 382/181, 382/190
See application file for complete search history.

(56) References Cited

U.S. PATENT DOCUMENTS 5,953,452 A * 9/1999 Boone et al. ............... 382/199
6,005,978 A * 12/1999 Garakani .................... 382/218
6,636,647 B1 * 10/2003 Ohki et al. .................. 382/284
6,674,915 B1 * 1/2004 Wang ......................... 382/263

* cited by examiner

*Primary Examiner*—Joseph Mancuso
*Assistant Examiner*—Hadi Akhavannik
(74) *Attorney, Agent, or Firm*—Gregory J. Koerner; Redwood Patent Law

(57) ABSTRACT

A system and method are disclosed for effectively utilizing universal feature detectors to generate closely-correlated universal feature information for use in various content-retrieval procedures. In certain embodiments, the universal feature detectors may generate a multi-scale gaussian pyramid based upon selected original image data by iteratively performing a series of summing transforms. The universal feature detectors may also calculate multi-scale histograms corresponding to the multi-scale gaussian pyramid, and may then perform Radon transforms upon the multi-scale histograms to produce and store corresponding Radon transform lines. The universal feature detectors may also generate a multi-scale laplacian pyramid from the multi-scale gaussian pyramid by iteratively performing a series of difference transforms. The resultant universal feature information may then advantageously provide various types of required feature information with optimal binding characteristics.

42 Claims, 8 Drawing Sheets

Fig. 3      222

SYSTEM AND METHOD FOR EFFECTIVELY UTILIZING UNIVERSAL FEATURE DETECTORS

CROSS-REFERENCE TO RELATED APPLICATIONS

This application relates to, and claims priority in, U.S. Provisional Patent Application Ser. No. 60/340,382, entitled "Universal Feature Detectors," filed on Dec. 12, 2001. The foregoing related application is commonly assigned, and is hereby incorporated by reference.

BACKGROUND SECTION

1. Field of the Invention

This invention relates generally to techniques for analyzing information, and relates more particularly to a system and method for effectively utilizing universal feature detectors.

2. Description of the Background Art

Implementing effective methods for analyzing information is a significant consideration for designers and manufacturers of contemporary electronic devices. However, effectively analyzing information with electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively analyzes and manipulates digital image data may benefit from an efficient implementation because of the large amount and complexity of the digital data involved.

Due to growing demands on system resources and substantially increasing data magnitudes, it is apparent that developing new techniques for analyzing information is a matter of concern for related electronic technologies. Therefore, for all the foregoing reasons, developing effective systems for analyzing information remains a significant consideration for designers, manufacturers, and users of contemporary electronic devices.

SUMMARY

In accordance with the present invention, a system and method are disclosed for effectively utilizing universal feature detectors. In one embodiment, initially, universal feature detectors or another appropriate entity may preferably access original image data provided by any appropriate data source. For example, original image data may be obtained from the Internet or other distributed computer network. In accordance with the present invention, the universal feature detectors or other appropriate entity may then designate an original image from the original image data as a first current level of a gaussian pyramid.

The universal feature detectors or other appropriate entity may then select a current pixel in the current level of the gaussian pyramid. The universal feature detectors or other appropriate entity may also designate a local neighborhood of pixels around the foregoing current pixel in the current level. Next, the universal feature detectors or other appropriate entity may generate a local histogram from the foregoing local neighborhood to be stored as one of multi-level local histograms.

In accordance with the present invention, the universal feature detectors or another appropriate entity may then perform a Radon transform upon the foregoing local histogram to thereby generate a corresponding Radon transform line in Radon transform space. The universal feature detectors or other appropriate entity may then preferably store the foregoing Radon transform line into universal feature information with other data corresponding to the current level of the gaussian pyramid.

Next, the universal feature detectors or other appropriate entity may perform a summing transform upon the foregoing current pixel and one or more neighboring pixels to thereby produce a current combination pixel by utilizing any appropriate techniques. The universal feature detectors or other appropriate entity may then store the result of the foregoing summing transform (the current combination pixel) in a corresponding location in the next-higher level of the gaussian pyramid.

The universal feature detectors or other appropriate entity may also perform a difference transform upon the forgoing current pixel and the same neighboring pixel to thereby produce a current residue pixel by utilizing any appropriate techniques. The universal feature detectors or other appropriate entity may then store the result of the difference transform (the current residue pixel) into a corresponding location in a corresponding current level of a laplacian pyramid.

In accordance with the present invention, the universal feature detectors or other appropriate entity may next determine whether any unprocessed pixels remain in the current level of the gaussian pyramid. If unprocessed pixels remain in the current level of the gaussian pyramid, then the present invention may return to select a different unprocessed pixel (which becomes a new current pixel) from the current level of the gaussian pyramid. The present invention may then repeatedly perform the foregoing procedure to thereby process all remaining pixels in the current level of the gaussian pyramid.

However, if no unprocessed pixels remain in the current level of the gaussian pyramid, then the universal feature detectors or other appropriate entity may increment the current level of the gaussian pyramid by a value of one to thereby change the current level of the gaussian pyramid to the next-higher level. Similarly, the universal feature detectors or other appropriate entity may preferably also increment the current level of the laplacian pyramid by a value of one to thereby change the current level of the laplacian pyramid to the next-higher level.

Next, the universal feature detectors or other appropriate entity may determine whether any more pyramid levels of the gaussian pyramid remain to be processed. In other words, the universal feature detectors or other appropriate entity may determine whether the top level of the gaussian pyramid has been reached. If more pyramid levels of the gaussian pyramid remain to be processed, then the present invention may return to select a new current pixel in the new current level for processing. The present invention may then repeatedly perform foregoing procedure to thereby process all remaining levels of the gaussian pyramid. However, if no more pyramid levels of the gaussian pyramid remain to be processed, then the procedure may preferably terminate since the universal feature information will have been completely generated.

In accordance with the present invention, the universal feature detectors may thus efficiently generate universal feature information that provides optimal binding characteristics for closely correlating and combining multiple types of feature information in a single entity. The present invention therefore advantageously integrates a plurality of feature detectors that provide both multi-scale transforms of subject data and a Radon-transform based feature detection of the same subject data. The present invention thus provides an improved system and method for effectively utilizing universal feature detectors.

DETAILED DESCRIPTION

The present invention relates to an improvement in information analysis techniques. The following description is presented to enable one of ordinary skill in the art to make and use the invention and is provided in the context of a patent application and its requirements. Various modifications to the disclosed embodiments will be readily apparent to those skilled in the art and the generic principles herein may be applied to other embodiments. Thus, the present invention is not intended to be limited to the embodiments shown, but is to be accorded the widest scope consistent with the principles and features described herein.

The present invention comprises a system and method for effectively utilizing universal feature detectors to generate closely-correlated universal feature information for use in various content-retrieval procedures. In certain embodiments, the universal feature detectors may generate a multi-scale gaussian pyramid based upon selected original image data by iteratively performing a series of summing transforms. The universal feature detectors may also calculate multi-scale histograms corresponding to the multi-scale gaussian pyramid, and may then perform Radon transforms upon the multi-scale histograms to produce and store corresponding Radon transform lines. The universal feature detectors may also generate a multi-scale laplacian pyramid from the multi-scale gaussian pyramid by iteratively performing a series of difference transforms. The resultant universal feature information may then advantageously provide various types of required feature information with optimal binding characteristics.

Figure 1:
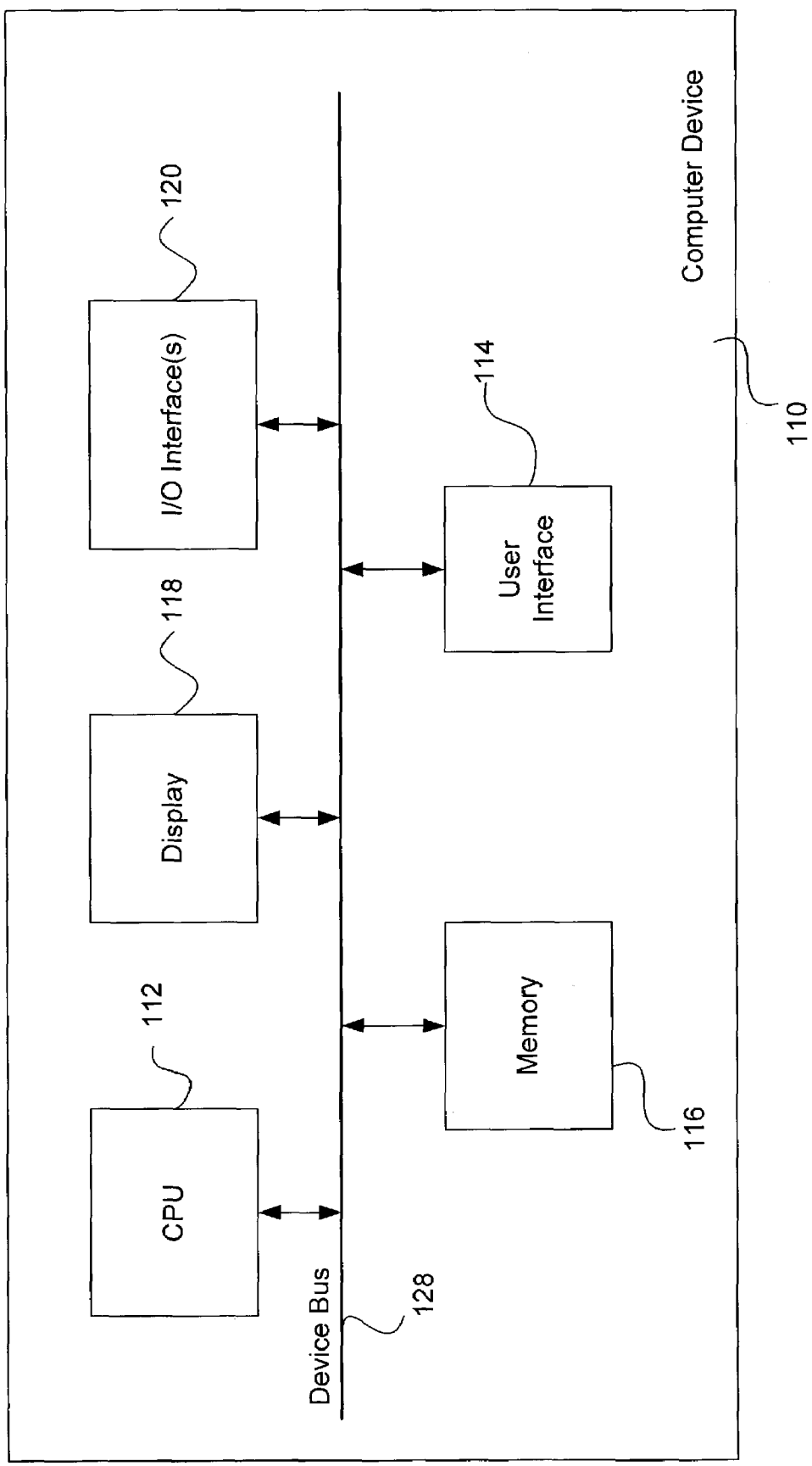
FIG. 1 is a block diagram for one embodiment of a computer device, in accordance with the present invention.

Referring now to FIG. 1, a block diagram for one embodiment of a computer device 110 is shown, in accordance with the present invention. In the FIG. 1 embodiment, computer device 110 preferably includes, but is not limited to, a central processing unit (CPU) 112, a user interface 114, memory 116, a display 118, and input/output interface(s) (I/O interface(s)) 120. The foregoing components of computer device 110 may preferably be coupled to, and communicate through, a device bus 128.

In alternate embodiments, computer device 110 may readily be implemented using various components and configurations in addition to, or instead of, those discussed in conjunction with the FIG. 1 embodiment. Furthermore, the present invention may readily be performed by various types of electronic devices other than computer device 110.

In the FIG. 1 embodiment, CPU 112 may be implemented to include any appropriate and compatible microprocessor device that preferably executes software instructions to thereby control and manage the operation of image manager 110. The FIG. 1 display 118 preferably may include any effective type of display technology including a cathode-ray-tube monitor or a liquid-crystal display device. In the FIG. 1 embodiment, I/O interface(s) 120 preferably may include one or more input and/or output interfaces to receive and/or transmit any required types of relevant information by image manager 110.

In the FIG. 1 embodiment, memory 116 may be implemented to include any combination of desired storage devices, including, but not limited to, read-only memory (ROM), random-access memory (RAM), and various types of non-volatile memory, such as floppy disks or hard disks. The contents and functionality of memory 116 are further discussed below in conjunction with FIGS. 2 and 3. In the FIG. 1 embodiment, user interface 114 preferably may include any effective means to allow a system user to communicate with image manager 110. For example, user interface 114 may support a keyboard device, a wireless remote control device, a speech-recognition module with corresponding microphone, or a graphical user interface with touch-screen capability.

Figure 2:
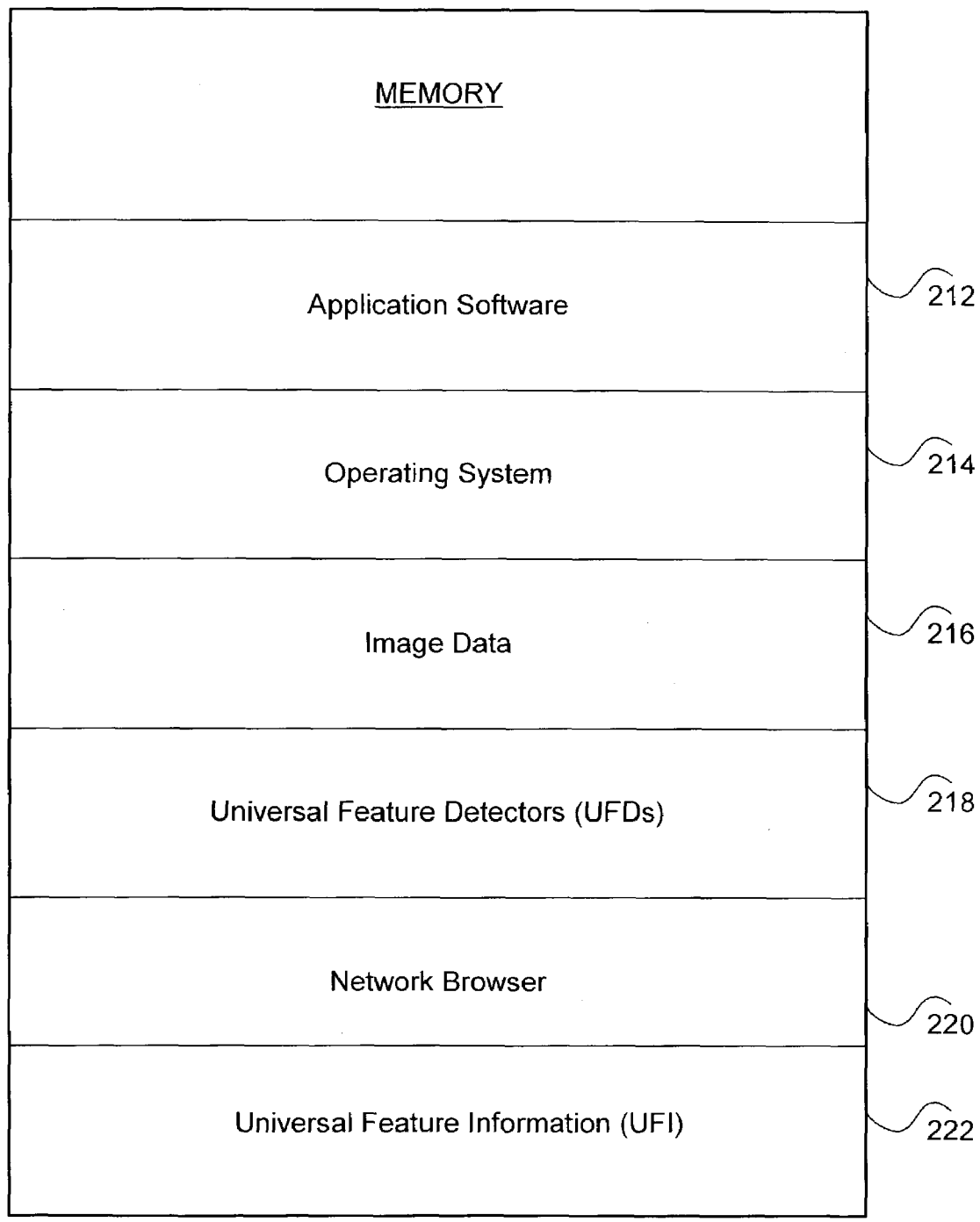
FIG. 2 is a block diagram for one embodiment of the memory of FIG. 1, in accordance with the present invention.

Referring now to FIG. 2, a block diagram for one embodiment of the FIG. 1 memory 116 is shown, in accordance with the present invention. In the FIG. 2 embodiment, memory 116 preferably includes, but is not limited to, application software 212, an operating system 214, image data 216, universal feature detectors 218, a network browser 220, and universal feature information 222. In alternate embodiments, memory 116 may readily include various other components in addition to, or instead of, those components discussed in conjunction with the FIG. 2 embodiment.

In the FIG. 2 embodiment, application software 212 may include program instructions that are preferably executed by CPU 112 (FIG. 1) to perform various functions and operations for computer device 110. The particular nature and functionality of application software 212 preferably varies depending upon factors such as the specific type and particular use of the corresponding computer device 110. In the FIG. 2 embodiment, operating system 214 preferably controls and coordinates low-level functionality of image manager 110.

Image data 216 preferably includes various types of data that is preferably stored in memory 116. Image data 216 preferably may include various types of captured image data or other types of information. For example, in certain embodiments, image data 216 may include one or more images that a system user obtains from an external source such as the Internet. In alternate embodiments, the present invention may readily be utilized to analyze data other than the image data 216 shown in FIG. 2.

In the FIG. 2 embodiment, universal feature detectors (UFDs) 218 may preferably be utilized to analyze various types of image data 216 to thereby generate corresponding universal feature information (UFI) 222. One embodiment for universal feature information 222 is further discussed below in conjunction with FIG. 3. Furthermore, the utilization of universal feature detectors 218 to generate universal feature information 222 is further discussed below in conjunction with FIGS. 7A and 7B.

In the FIG. 2 embodiment, network browser 220 preferably may control bi-directional communications between computer device 110 and a distributed computing network. For example, network browser 220 may include an Internet browser module to allow computer device 110 to perform various search and retrieval procedures based upon universal feature information 222 to thereby download appropriate corresponding information from the Internet.

Figure 3:
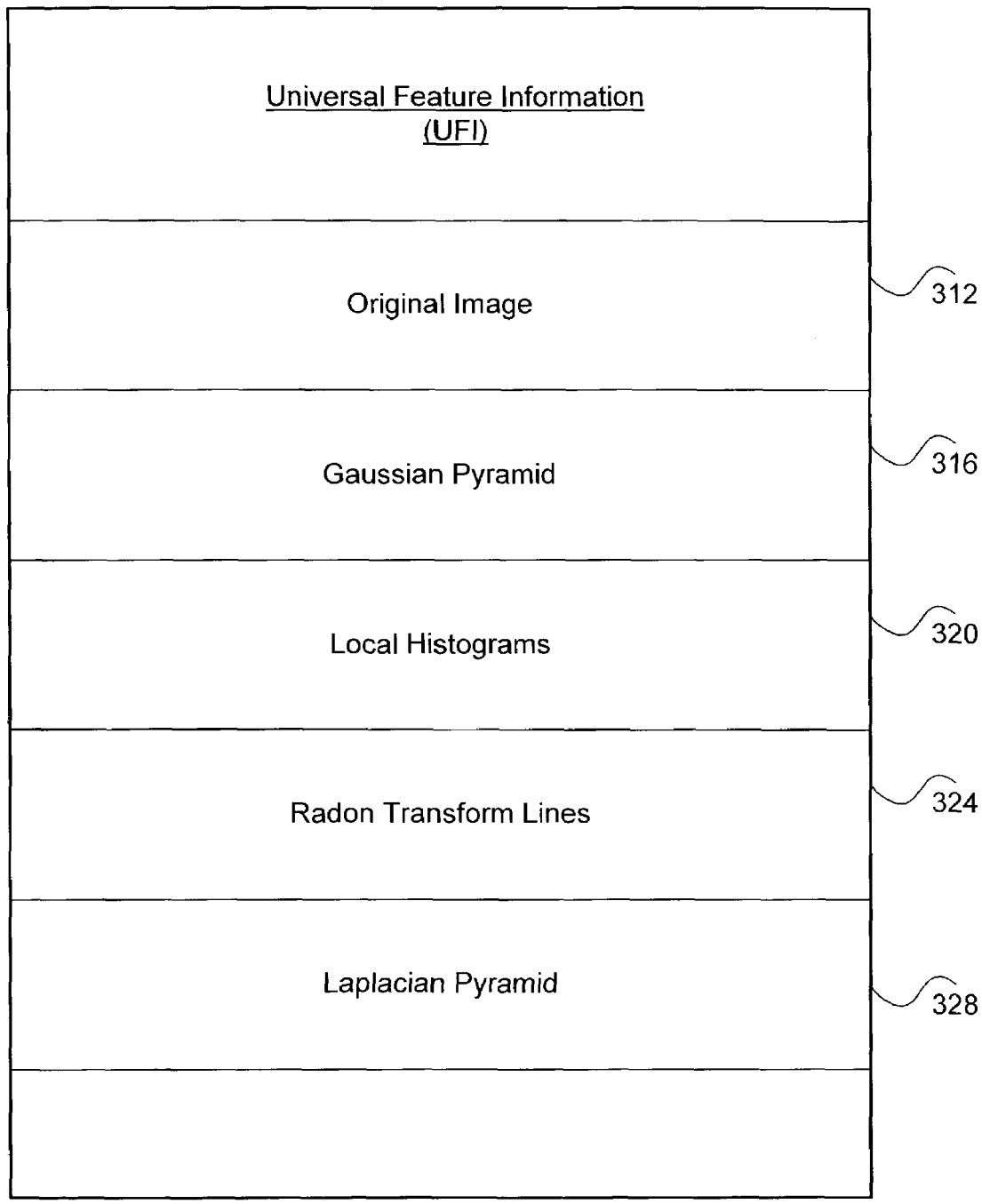
FIG. 3 is a block diagram for one embodiment of the universal feature information of FIG. 2, in accordance with the present invention.

Referring now to FIG. 3, a block diagram for one embodiment of the FIG. 2 universal feature information 222 is shown, in accordance with the present invention. In the FIG. 3 embodiment, universal feature information 222 may include, but is not limited to, an original image 312, a gaussian pyramid 316, local histograms 320, radon transform lines 324, and a laplacian pyramid 328. In alternate embodiments, universal feature information 222 may readily include various other components in addition to, or instead of, those components discussed in conjunction with the FIG. 3 embodiment. The generation of universal feature information 222 such as gaussian pyramid 316, local histograms 320, radon transform lines 324, and laplacian pyramid 328 by utilizing universal feature detectors 218 is further discussed below in conjunction with FIGS. 5, 7A, and 7B.

Figure 4:
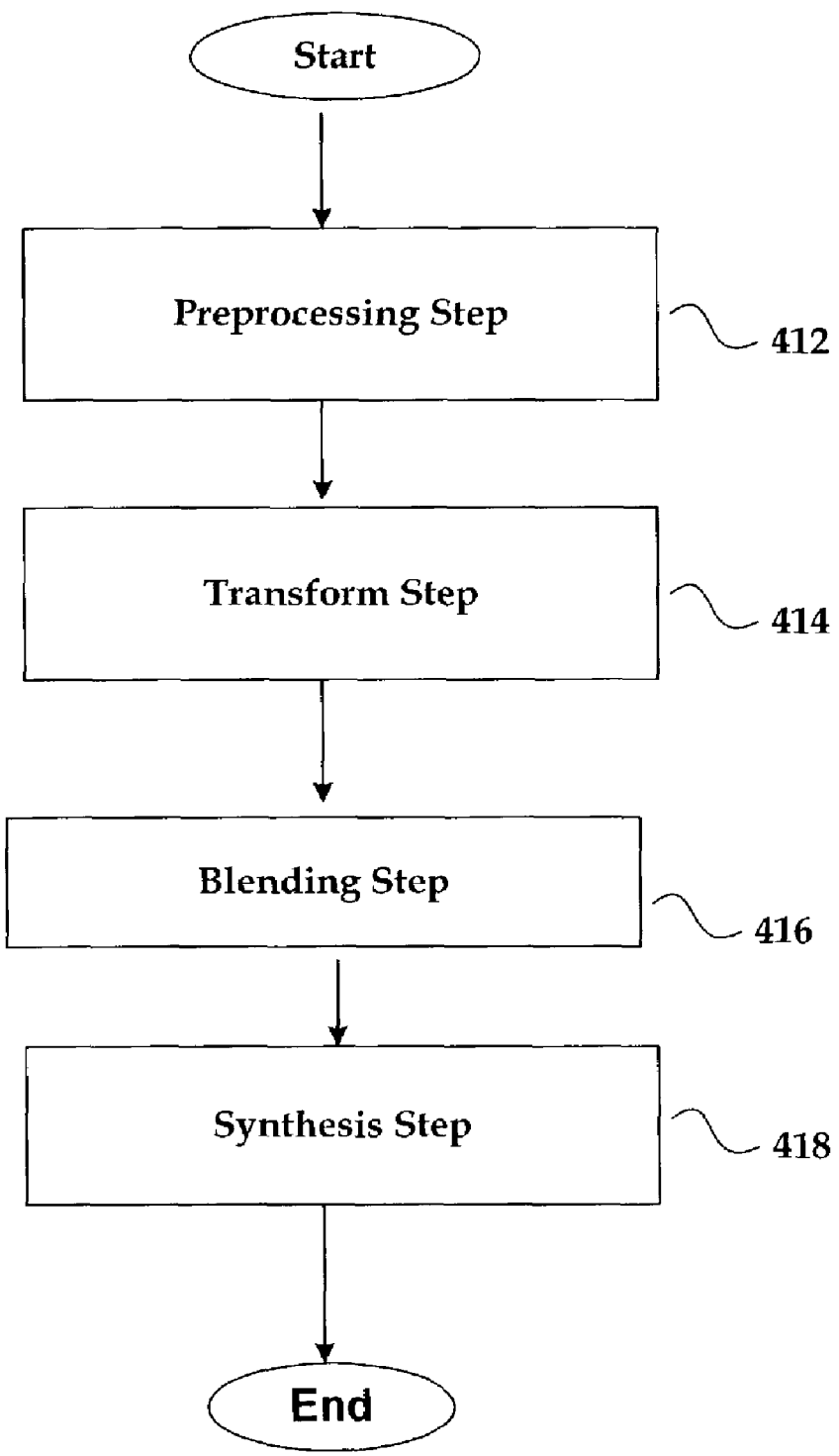
FIG. 4 is a flowchart of method steps for performing a generalized feature detection procedure, in accordance with one embodiment of the present invention.

Referring now to FIG. 4, a flowchart of method steps for performing a generalized feature detection procedure is shown, in accordance with one embodiment of the present invention. The FIG. 4 example is presented for purposes of illustration, and, in alternate embodiments, the present invention may readily utilize various other steps and sequences than those discussed in conjunction with the FIG. 4 embodiment.

In the FIG. 4 embodiment, in step 412, universal feature detectors 218 or other appropriate entity may preferably perform a preprocessing step to process and prepare subject data for a subsequent feature detection procedure. Then, in step 414, universal feature detectors 218 or another appropriate entity may preferably perform a transform step to convert the subject data into a desired format or transform space for performing the feature detection procedure. Next, in step 416, universal feature detectors 218 or another appropriate entity may preferably perform a blending step to blend or interpret the subject data in the transform space. Finally, in step 418, universal feature detectors 218 or another appropriate entity may preferably perform a synthesis step upon the subject data. For example, in step 418, universal feature detectors 218 or another appropriate entity may perform a backprojection procedure to recover the original subject data of the feature detection procedure. The FIG. 4 process may then preferably terminate.

Figure 5:
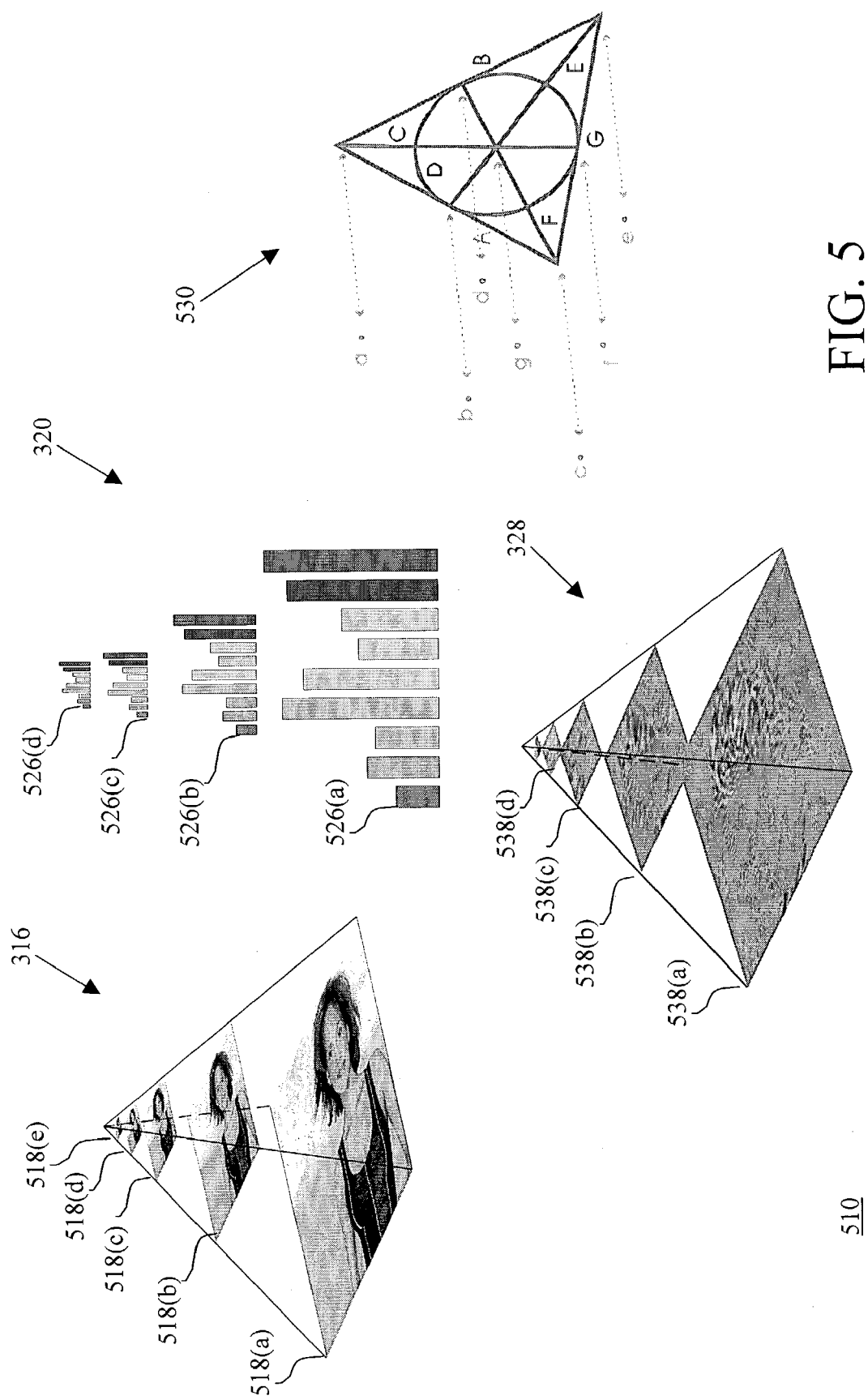
FIG. 5 is a block diagram illustrating a procedure for utilizing universal feature detectors, in accordance with one embodiment of the present invention.

Referring now to FIG. 5, a block diagram 510 illustrating a procedure for utilizing universal feature detectors 218 (FIG. 2) is shown, in accordance with one embodiment of the present invention. In alternate embodiments, the present invention may readily utilize universal feature detectors 218 in various other manners in addition to, or instead of, those discussed in conjunction with the FIG. 5 embodiment. For example, the FIG. 5 example is primarily directed towards generating universal feature information for color image data. However, the present invention may readily be utilized to generate appropriate universal feature information for other types of subject data.

In the FIG. 5 embodiment, initially, universal feature detectors 218 (FIG. 2) or another appropriate entity may preferably access original image data 216 (FIG. 2) provided by any appropriate data source. For example, original image data 216 may be obtained from the Internet or other distributed computer network. In accordance with the present invention, universal feature detectors 218 or other appropriate entity may then designate an original image 312 from original image data 216 as a first current level 518($a$) of a gaussian pyramid 316.

Universal feature detectors 218 or other appropriate entity may then select a current pixel in the current level 518 of gaussian pyramid 316. Universal feature detectors 218 or other appropriate entity may also designate a local neighborhood of pixels around the foregoing current pixel in current level 518. Next, universal feature detectors 218 or other appropriate entity may generate a local histogram 526 from the foregoing local neighborhood to be stored as one of the set of multi-level local histograms 320 (FIG. 3).

In accordance with the present invention, universal feature detectors 218 or another appropriate entity may then perform a Radon transform upon the foregoing local histogram 526 to thereby generate a corresponding Radon transform line 324 (FIG. 3) in Radon transform space 530. Radon transforms essentially sum all values of a particular function (here, color histograms) that lie along a particular Radon transform line parameterized by a value alpha (the slope of the Radon transform line) and a value "p" (the distance of the Radon transform line from a zero axis in Radon transform space).

Radon transforms are further discussed in "Curve Parameter Detection Using The Radon Transform," A Doctoral Thesis, by Peter Toft, pages 1–36, 1996, which is hereby incorporated by reference. Universal feature detectors 218 or another appropriate entity may then preferably store the foregoing Radon transform line 324 into universal feature information 222 (FIG. 3) with data corresponding to the current level 518 of gaussian pyramid 316.

Next, universal feature detectors 218 or other appropriate entity may perform a summing transform upon the foregoing current pixel and one or more neighboring pixels to thereby produce a current combination pixel by utilizing any appropriate techniques. For example, in certain embodiments the foregoing summing transform may be performed in accordance with a formula:

$$\text{Combination Pixel} = (\text{Pixel } A + \text{Pixel } B)/2$$

where Pixel A is a current pixel and Pixel B is a neighboring pixel. In alternate embodiments, more than two pixels may be utilized in the summing transform. Furthermore, in certain embodiments various weighting values may be applied to the pixel values in the summing transform.

Universal feature detectors 218 or other appropriate entity may then store the result of the foregoing summing transform (the current combination pixel) in a corresponding location in the next-higher level 518 of gaussian pyramid 316. For example, if the current pixel and the neighboring pixel are from level 518($a$) of gaussian pyramid 316, then a result of the summing transform may be utilized to populate the next-higher level 518(b) of gaussian pyramid 316. In certain embodiments, universal feature detectors 218 may generate a given combination pixels by choosing a representative of a nearest cluster with reference to a corresponding Radon transform line 324 instead of performing the foregoing summing transform.

Universal feature detectors 218 or other appropriate entity may also perform a difference transform upon the forgoing current pixel and the same neighboring pixel to thereby produce a current residue pixel by utilizing any appropriate techniques. For example, in certain embodiments the foregoing difference transform may be performed in accordance with a formula:

Residue Pixel=(Pixel A−Pixel B)/2 where Pixel A is the current pixel and Pixel B is the neighboring pixel. In alternate embodiments, more than two pixels may be utilized in the summing transform. Furthermore, in certain embodiments various weighting values may be applied to the pixel values in the summing transform.

Universal feature detectors 218 or other appropriate entity may then store the result of the difference transform (the current residue pixel) into a corresponding location in a corresponding current level of a laplacian pyramid 328. For example, if the current pixel and the neighboring pixel are from level 518(a) of gaussian pyramid 316, then a result of the difference transform may be utilized to populate corresponding level 538(a) of laplacian pyramid 328. Laplacian pyramids are further discussed in "The Laplacian Pyramid As A Compact Image Code," by Peter Burt and Edward Adelson, IEEE Transactions On Communications, Vol. Com-31, No. 4, April 1983, which is hereby incorporated by reference.

In accordance with the present invention, universal feature detectors 218 or other appropriate entity may next determine whether any unprocessed pixels remain in the current level 518 of gaussian pyramid 316. If unprocessed pixels remain in the current level 518 of gaussian pyramid 316, then the present invention may return to select a different unprocessed pixel (which becomes a new current pixel) from the current level 518 of gaussian pyramid 316. The present invention may then repeatedly perform the foregoing procedure to thereby process all remaining pixels in the current level 518 of gaussian pyramid 316.

However, if no unprocessed pixels remain in the current level 518 of gaussian pyramid 316, then universal feature detectors 218 or other appropriate entity may increment the current level 518 of gaussian pyramid 316 by a value of one to thereby change the current level 518 of gaussian pyramid 316 to the next-higher level 518. For example, if the present invention is processing an initial current level 518(a) of gaussian pyramid 316, then after the foregoing level incrementing step, the present invention would then begin processing a new current level 518(b).

Similarly, universal feature detectors 218 or other appropriate entity may preferably also increment the current level 538 of laplacian pyramid 328 by a value of one to thereby change the current level 538 of laplacian pyramid 328 to the next-higher level 538. For example, if the present invention is generating an initial current level 538(a) of laplacian pyramid 328, then after the level incrementing procedure of step 756, the present invention would then begin generating a new current level 538(b).

Next, universal feature detectors 218 or other appropriate entity may determine whether any more pyramid levels 518 of gaussian pyramid 316 remain to be processed. In other words, universal feature detectors 218 or other appropriate entity may determine whether the top level of the gaussian pyramid 316 has been reached. If more pyramid levels 518 of gaussian pyramid 316 remain to be processed, then the present invention may return to select a new current pixel in the new current level 518 for processing. The present invention may then repeatedly perform foregoing procedure to thereby process all remaining levels 518 of gaussian pyramid 316. However, if no more pyramid levels 518 of gaussian pyramid 316 remain to be processed, then the procedure may preferably terminate since the universal feature information will have been completely generated.

In certain embodiments, in which the type of feature information required is appropriate, the present invention may alternately utilize a wavelet transform to generate universal feature information similar to the gaussian pyramid 316 and the laplacian pyramid 328. Wavelet transforms are further discussed in "Building Your Own Wavelets At Home," by Wim Sweldens and Peter Schroder, Technical Report 1995:5, Industrial Mathematics Initiative, Department of Mathematics, University of South Carolina, 1995, which is hereby incorporated by reference.

In accordance with the FIG. 5 embodiment, universal feature detectors 218 have thus efficiently generated universal feature information 222 that provides optimal binding characteristics for closely correlating and combining multiple types of feature information in a single entity. The present invention therefore advantageously integrates a plurality of feature detectors that provide both multi-scale transforms of subject data (here, image data) and a Radon-transform based feature detection of the same subject data.

Universal feature information 222 may then be efficiently utilized to derive a significant number of relevant features. For example, the original image 312 may readily be recovered because the algorithm is perfectly reconstructable. One technique for recovering original image 312 is further discussed below in conjunction with FIG. 6.

Universal feature information 222 may also provide local color histograms 320 at various scales corresponding to the levels 518 of gaussian pyramid 316. Local color constancy data and illuminant colors may be derived from Radon transform lines 324. Furthermore, Radon transform lines 324 may be utilized to shift the illuminant of original image 312.

In certain embodiments, the present invention may also provide various saliency features to indicate how important or significant a piece of information from an image is in relation to other similar information from the image. For example, the present invention may utilize a thresholding step to remove many edges and gradients from an image to thereby produce a "sketch" image with only the most salient edge features included.

Furthermore, in certain embodiments, a feature overlap analysis procedure may be utilized to determine the extent to which multiple correlated features from universal feature information 222 redundantly contain the same information. The present invention may then advantageously optimize the stored feature information to eliminate redundant information or information which is not considered significant. The foregoing process for effectively utilizing universal feature detectors 218 is further discussed below in conjunction with FIGS. 7A and 7B.

Figure 6:
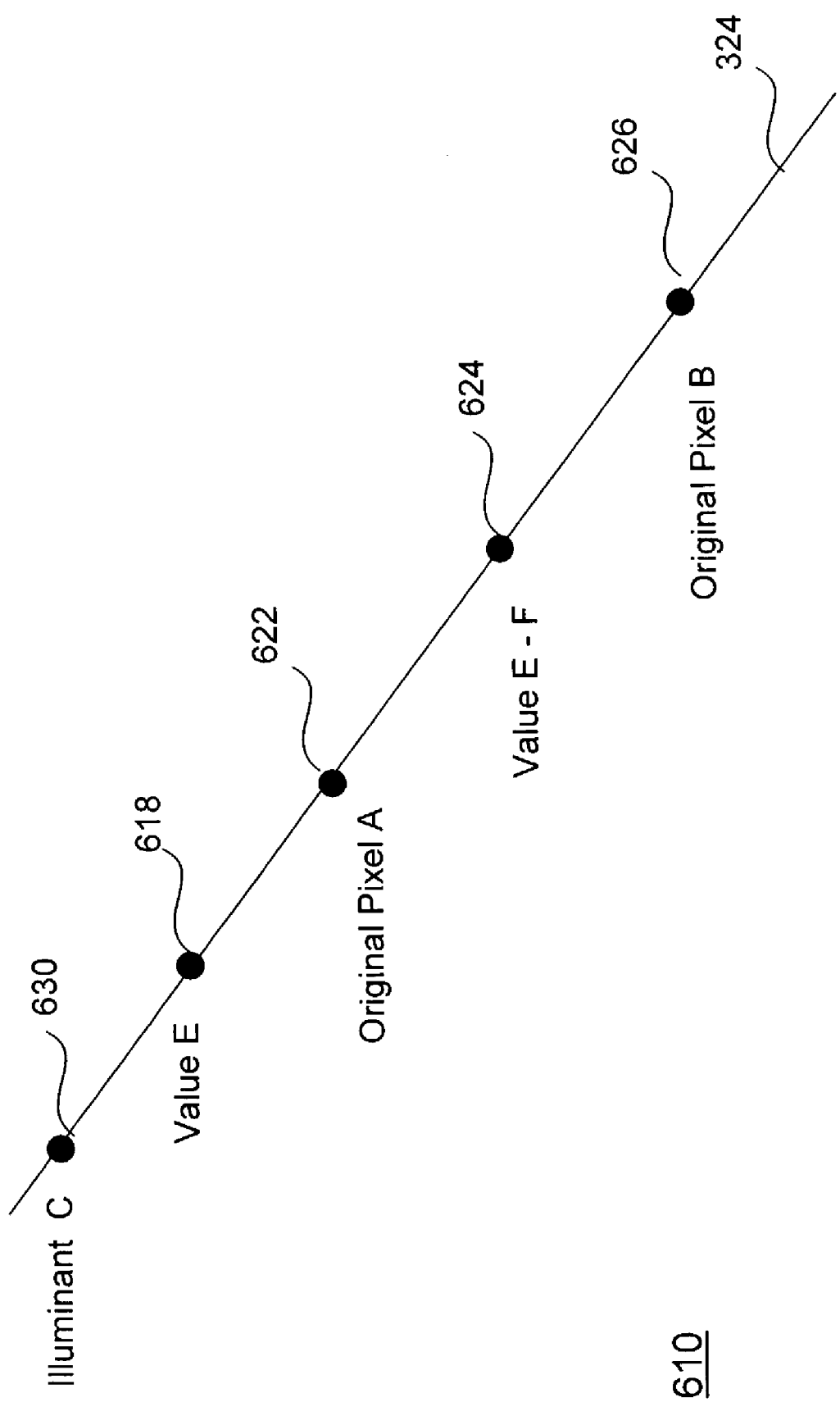
FIG. 6 is a diagram illustrating a procedure for recovering original image data from universal feature information, in accordance with one embodiment of the present invention.

Referring now to FIG. 6, a block diagram 610 illustrating a procedure for recovering an original image 312 from selected universal feature information 222 is shown, in accordance with the present invention. The FIG. 6 embodiment is presented for purposes of illustration, and in alternate embodiments, the present invention may readily utilize various other techniques for recovering original images 312 from selected universal feature information 222 in addition to, or instead of, those discussed in conjunction with the FIG. 6 embodiment.

Universal feature information 222 (FIG. 2) may include laplacian pyramid 328 and gaussian pyramid 328 which include various values and universal features information. Therefore, since the formulas for the summing transform and difference transform are known, then original pixel A 622 and original pixel B 626 may be calculated. In certain embodiments, only the top level 518 of gaussian pyramid 316 need be stored because each of the other levels 518 may be regenerated by utilizing information from the next-lower level 538 of laplacian pyramid 328 and a current level 518 of gaussian pyramid 316. The foregoing process may be sequentially repeated for each pixel of each level 518 until the original image 312 at the bottom level 518(*a*) of gaussian pyramid 316 has been recovered.

In the FIG. 6 example, a Radon transform line 324 is shown including an illuminant C 630, a value E 618, an original pixel A 622, a value E-F 624, and an original pixel B 626. In the foregoing discussion of FIG. 5, original pixel A 622 is also referred to as a current pixel, and original pixel B 624 is also referred to as a neighboring pixel. As discussed above, universal feature information 222 may include radon transform lines 324 which also provide illuminants C 630 that are located at the end of each Radon transform line 324.

In the FIG. 6 embodiment, value E 618 may be equal to an average of original pixel A 622 plus illuminant C 630, and may be expressed by the formula $E=(A+C)/2$. In the FIG. 6 embodiment, value E 618 may be utilized to populate a next-higher level 518 of gaussian pyramid 316, as discussed above in conjunction with FIG. 5. In the FIG. 6 embodiment, value E–F 624 may be calculated by utilizing value E 618 and a value F (not shown). Value F may be equal to original pixel B 626 minus illuminant C all divided by two, and may be expressed by the formula $F=(B-C)/2$. In the FIG. 6 embodiment, the foregoing value F may be utilized to populate a current level 538 of laplacian pyramid 328, as discussed above in conjunction with FIG. 5.

In the FIG. 6 embodiment, gaussian pyramid 316 may be recovered using value E 618 and value E–F 624 to find illuminant C 630. Then, value E–F 624 may equal the average of original pixel A 622 plus original pixel B, which may be expressed by the formula $E-F=(A+B)/2$. Similarly, value E 618 plus value F minus two times the illuminant C 630 equals original pixel A 622 minus original pixel B 626 all divided by two, which may be expressed by the formula $E+F-2C=(A-B)/2$. Original pixel A 622 and original pixel B 626 may thus be recovered as in the case of a Haar wavelet or in the foregoing FIG. 5 embodiment.

Figure 7A:
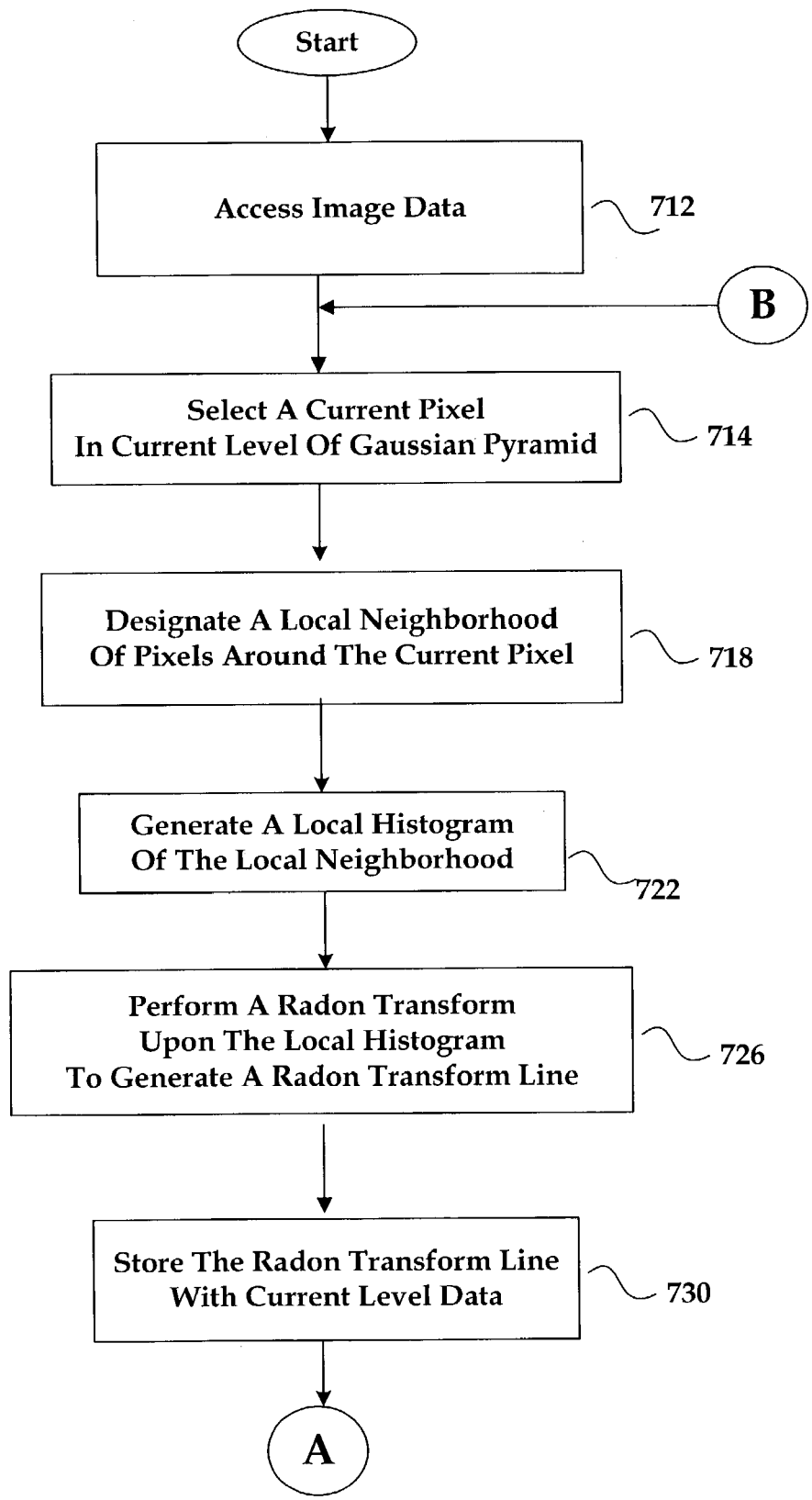
FIG. 7A is a flowchart of initial method steps for effectively utilizing universal feature detectors, in accordance with one embodiment of the present invention.

Referring now to FIG. 7A, a flowchart of initial method steps for effectively utilizing universal feature detectors 218 is shown, in accordance with one embodiment of the present invention. The FIG. 7A example is presented for purposes of illustration, and, in alternate embodiments, the present invention may readily utilize various other steps and sequences than those discussed in conjunction with the FIG. 7A embodiment.

In the FIG. 7A embodiment, initially, in step 712, universal feature detectors 218 (FIG. 2) or another appropriate entity may preferably access original image data 216 (FIG. 2) provided by any appropriate data source. For example, original image data 216 may be obtained from the Internet or other distributed computer network. In accordance with the present invention, universal feature detectors 218 or other appropriate entity may then designate an original image 312 from original image data 216 as a first current level 518(*a*) of a gaussian pyramid 316.

In step 714, universal feature detectors 218 or other appropriate entity may select a current pixel in the current level 518 of gaussian pyramid 316. Then, in step 718, universal feature detectors 218 or other appropriate entity may designate a local neighborhood of pixels around the foregoing current pixel in current level 518. Next, in step 722, universal feature detectors 218 or other appropriate entity may generate a local histogram 526 from the foregoing local neighborhood to be stored as one of the local histograms 320 (FIG. 3).

In step 726, universal feature detectors 218 or another appropriate entity may then perform a Radon transform upon the foregoing local histogram 526 to thereby generate a corresponding Radon transform line 324 (FIG. 3) in Radon transform space 530, as discussed above in conjunction with FIG. 5. In step 730, universal feature detectors 218 or another appropriate entity may preferably store the foregoing Radon transform line 324 into universal feature information 222 (FIG. 3) with data corresponding to the current level 518 of gaussian pyramid 316. The FIG. 7A process may then preferably advance via letter "A" to step 736 of FIG. 7B.

Figure 7B:
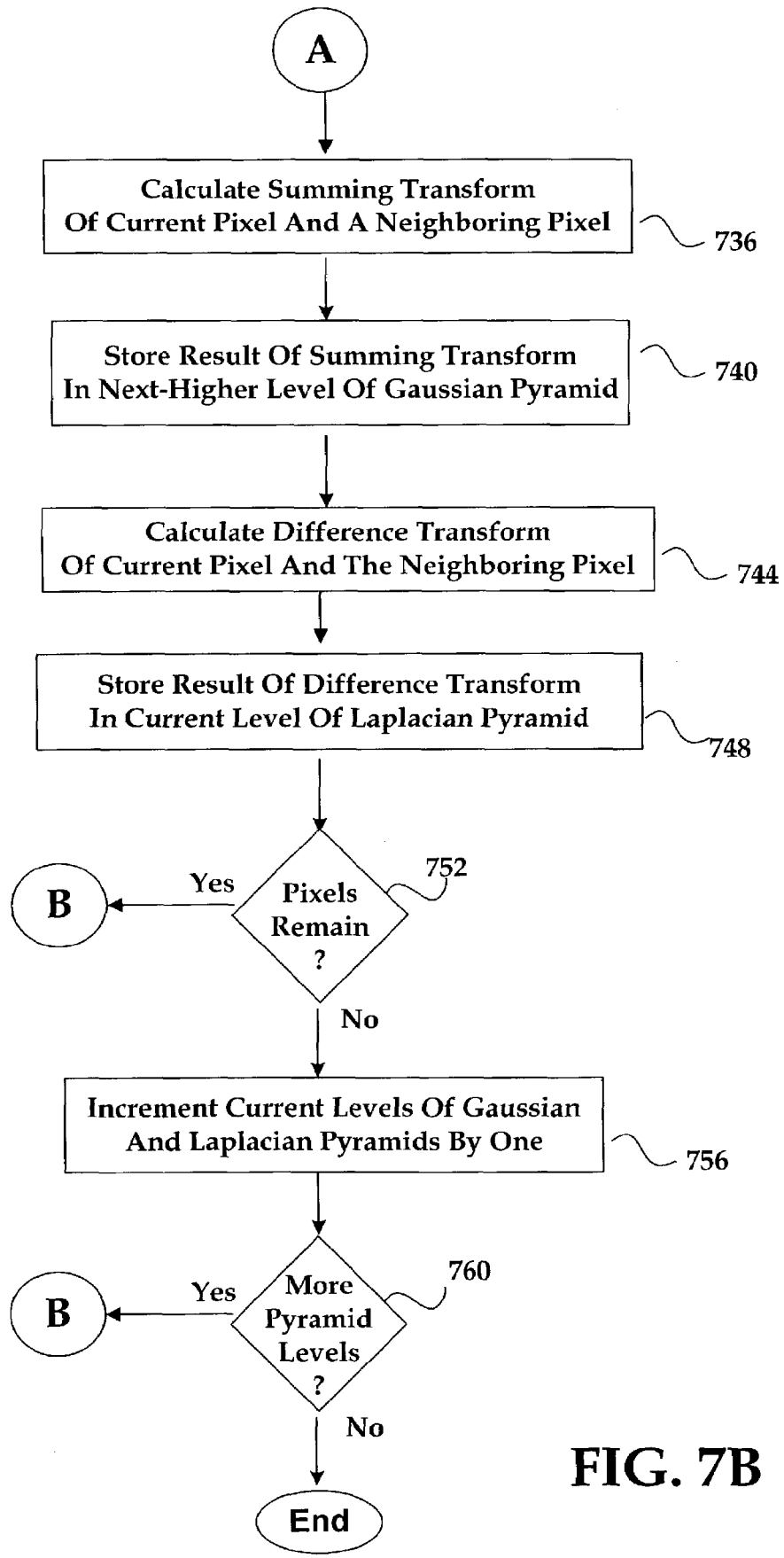
FIG. 7B is a flowchart of final method steps for effectively utilizing universal feature detectors in accordance with one embodiment of the present invention.

Referring now to FIG. 7B, a flowchart of final method steps for effectively utilizing universal feature detectors 218 is shown, in accordance with one embodiment of the present invention. The FIG. 7B example is presented for purposes of illustration, and, in alternate embodiments, the present invention may readily utilize various other steps and sequences than those discussed in conjunction with the FIG. 7B embodiment.

In the FIG. 7B embodiment, in step 736, universal feature detectors 218 or other appropriate entity may perform a summing transform upon the foregoing current pixel of FIG. 7A and a neighboring pixel to produce a current combination pixel, as discussed above in conjunction with FIG. 5. Then in step 740, universal feature detectors 218 or other appropriate entity may store the result of the summing transform (the current combination pixel) in a corresponding location in the next-higher level of gaussian pyramid 316. For example, if the current pixel and the neighboring pixel are from level 518(*a*) of gaussian pyramid 316, then a result of the summing transform may be utilized to populate the next-higher level 518(*b*) of gaussian pyramid 316.

In step 744, universal feature detectors 218 or another appropriate entity may perform a difference transform upon the forgoing current pixel of FIG. 7A and the same neighboring pixel used in step 736 to thereby produce a current residue pixel, as discussed above in conjunction with FIG. 5. Then in step 748, universal feature detectors 218 or another appropriate entity may store the result of the difference transform (the current residue pixel) in a corresponding location in a corresponding level of laplacian pyramid 328. For example, if the current pixel and the neighboring pixel are from level 518(*a*) of gaussian pyramid 316, then a result of the difference transform may be utilized to populate corresponding level 538(*a*) of laplacian pyramid 328.

In step 752, universal feature detectors 218 or another appropriate entity may determine whether any unprocessed pixels remain in the current level 518 of gaussian pyramid 316. If unprocessed pixels remain in the current level 518 of gaussian pyramid 316, then the FIG. 7B process may return to step 714 of FIG. 7A to select another unprocessed pixel (which becomes a new current pixel). The present invention may then repeatedly perform foregoing steps 714 through 752 of FIGS. 7A and 7B to thereby process all remaining pixels in the current level 518 of gaussian pyramid 316.

However, in step 752, if no unprocessed pixels remain in the current level 518 of gaussian pyramid 316, then in step 756, universal feature detectors 218 or other appropriate entity may increment the current level 518 of gaussian pyramid 316 by a value of one to thereby change the current level 518 of gaussian pyramid 316 to the next-higher level 518. For example, if the present invention is processing an initial current level 518(a) of gaussian pyramid 316, then after the level incrementing procedure of step 756, the present invention would then begin processing a new current level 518(b).

Similarly, in step 756, universal feature detectors 218 or other appropriate entity may preferably also increment the current level 538 of laplacian pyramid 328 by a value of one to thereby change the current level 538 of laplacian pyramid 328 to the next-higher level 538. For example, if the present invention is generating an initial current level 538(a) of laplacian pyramid 328, then after the level incrementing procedure of step 756, the present invention would then begin generating a new current level 538(b).

In step 760, universal feature detectors 218 or other appropriate entity may determine whether any more pyramid levels 518 of gaussian pyramid 316 remain to be processed. In other words, universal feature detectors 218 or other appropriate entity may determine whether the top level of the gaussian pyramid 316 has been reached. If more pyramid levels 518 of gaussian pyramid 316 remain to be processed, then the FIG. 7B process may return to step 714 of FIG. 7A to select a new current pixel in the new current level 518 for processing. The present invention may then repeatedly perform foregoing steps 714 through 752 of FIGS. 7A and 7B to thereby process all remaining levels 518 of gaussian pyramid 316. However, in step 760, if no more pyramid levels 518 of gaussian pyramid 316 remain to be processed, then the FIG. 7B process may preferably terminate.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for effectively analyzing subject data, comprising:
    a universal feature detector configured to generate universal feature information by analyzing said subject data, said universal feature information including one or more multi-scale transforms of said subject data, said multi-scale transforms including at least one multi-level pyramid structure of said universal feature information, said universal feature information also including Radon transforms of said subject data, said universal feature detectors calculating Radon transform lines derived from local histograms corresponding to said multi-level pyramid, said universal feature information providing a plurality of closely correlated features corresponding to said subject data; and
    a processor configured to control said universal feature detector to thereby effectively analyze said subject data.

2. The system of claim 1 wherein said subject data includes image data, and wherein said universal feature information is utilized to perform an image retrieval procedure based upon corresponding features from said image data to thereby retrieve other image data from a distributed computer network that includes an Internet network.

3. A system for effectively analyzing subject data, comprising:
    a universal feature detector configured to generate universal feature information by analyzing said subject data, said universal feature information including one or more multi-scale transforms of said subject data, said universal feature information also including Radon transforms of said subject data, said universal feature information providing a plurality of closely correlated features corresponding to said subject data, said universal feature information including an original image, a gaussian pyramid, local histograms derived from said gaussian pyramid, Radon transform lines derived from said local histograms, and a laplacian pyramid derived from said gaussian pyramid; and
    a processor configured to control said universal feature detector to thereby effectively analyze said subject data.

4. A system for effectively analyzing subject data, comprising:
    a universal feature detector configured to generate universal feature information by analyzing said subject data, said universal feature information including one or more multi-scale transforms of said subject data, said universal feature information also including Radon transforms of said subject data, said universal feature information providing a plurality of closely correlated features corresponding to said subject data, said universal feature information being utilized to provide a reconstructable original image, local color histograms at various scales corresponding to levels of a gaussian pyramid, local color constancy data, illuminant colors derived from corresponding Radon transform lines, said Radon transform lines also being utilized to shift said illuminant colors of said original reconstructable image; and
    a processor configured to control said universal feature detector to thereby effectively analyze said subject data.

5. The system of claim 1 wherein said universal feature detectors perform a generalized feature detection process by sequentially performing a preprocessing step, a transform step, a blending step, and a synthesis step.

6. A system for effectively analyzing subject data, comprising:
    a universal feature detector configured to generate universal feature information by analyzing said subject data, said universal feature information including one or more multi-scale transforms of said subject data, said universal feature information also including Radon transforms of said subject data, said universal feature information providing a plurality of closely correlated features corresponding to said subject data, said universal feature detectors generating a multi-scale gaussian pyramid based upon said subject data by iteratively performing summing transforms, said universal feature detectors also calculating multi-scale histograms corresponding to said multi-scale gaussian pyramid, said universal feature detectors then performing Radon transforms upon said multi-scale histograms to produce and store corresponding Radon transform lines, said universal feature detectors also generating a multi-scale laplacian pyramid from said multi-scale gaussian pyramid by iteratively performing difference transforms; and a processor configured to control said universal feature detector to thereby effectively analyze said subject data.

7. The system of claim 1 wherein said universal feature detectors designate said subject data as a current level of a gaussian pyramid and then select a current pixel in said current level of said gaussian pyramid.

8. The system of claim 7 wherein said universal feature detectors designate a local neighborhood of pixels around said current pixel and then generate a local histogram from said local neighborhood to be stored as part of said universal features information.

9. A system for effectively analyzing subject data, comprising:

a universal feature detector configured to generate universal feature information by analyzing said subject data, said universal feature information including one or more multi-scale transforms of said subject data, said universal feature information also including Radon transforms of said subject data, said universal feature information providing a plurality of closely correlated features corresponding to said subject data, said universal feature detectors designating said subject data as a current level of a gaussian pyramid and then selecting a current pixel in said current level of said gaussian pyramid, said universal feature detectors designating a local neighborhood of pixels around said current pixel and then generating a local histogram from said local neighborhood to be stored as part of said universal features information, said universal feature detectors performing a Radon transform upon said local histogram to thereby generate a corresponding Radon transform line in Radon transform space, said universal feature detectors storing said Radon transform line into said universal feature information with feature data corresponding to said current level of said gaussian pyramid; and a processor configured to control said universal feature detector to thereby effectively analyze said subject data.

10. The system of claim 9 wherein said universal feature detectors perform a summing transform upon said current pixel and a neighboring pixel to thereby produce a current combination pixel, said universal feature detectors storing said current combination pixel in a corresponding location in a next-higher level of said gaussian pyramid.

11. The system of claim 10 wherein said universal feature detectors perform said summing transform according to a formula:

Combination Pixel=(Pixel $A$+Pixel $B$)/2 where said Pixel A is said current pixel and said Pixel B is said neighboring pixel.

12. The system of claim 10 wherein said universal feature detectors perform a difference transform upon said current pixel and said neighboring pixel to thereby produce a current residue pixel, said universal feature detectors storing said current residue pixel into a comparable location in a corresponding level of a laplacian pyramid.

13. The system of claim 12 wherein said universal feature detectors perform said difference transform according to a formula:

Residue Pixel=(Pixel $A$−Pixel $B$)/2 where said Pixel A is said current pixel and said Pixel B is said neighboring pixel.

14. The system of claim 12 wherein said universal feature detectors determine whether any unprocessed pixels remain in said current level of said gaussian pyramid, said universal feature detectors returning to select a different unprocessed pixel from said current level of said gaussian pyramid whenever unprocessed pixels remain in said current level of said gaussian pyramid, said different unprocessed pixel then becoming said current pixel, said universal feature detector then repeatedly processing all remaining pixels in said current level of said gaussian pyramid.

15. The system of claim 14 wherein, whenever no unprocessed pixels remain in said current level of said gaussian pyramid, said universal feature detectors then increment said current level of said gaussian pyramid by a value of one to thereby change said current level of said gaussian pyramid to said next-higher level, said universal feature detectors also incrementing said current level of said laplacian pyramid by a value of one to thereby change said current level of said laplacian pyramid to said next-higher level, said universal feature detectors then determining whether said current level of said gaussian pyramid coincide to a top level of said gaussian pyramid, said universal feature detector returning to select a new pixel as said current pixel in said current level for processing whenever said current level of said gaussian pyramid does not coincide to said top level, said universal feature detectors then repeatedly processing all remaining levels of said gaussian pyramid.

16. The system of claim 1 wherein said universal feature detectors utilize a wavelet transform to generate multi-scale information in said universal feature information.

17. The system of claim 1 wherein said universal feature detectors generate saliency features to indicate how important a piece of information from said subject data is in relation to other similar information from said subject data, said universal feature detectors utilizing a thresholding step to remove selectable edges and gradients from image data to thereby produce a sketch image with only salient edge features included.

18. The system of claim 1 wherein said universal feature detectors utilize a feature overlap analysis procedure to determine whether multiple correlated features from said universal feature information redundantly contain similar information, said universal feature detectors then advantageously optimizing said universal feature information to eliminate said similar information.

19. A system for effectively analyzing subject data, comprising:

a universal feature detector configured to generate universal feature information by analyzing said subject data, said universal feature information including one or more multi-scale transforms of said subject data, said multi-scale transforms including at least one multi-level pyramid structure of said universal feature information, said universal feature information also including Radon transforms of said subject data, said universal feature information providing a plurality of closely correlated features corresponding to said subject data, said universal feature detectors recovering original pixels from said subject data by utilizing said universal feature information, said original pixels including a series of current pixels and a corresponding series of neighboring pixels, said universal feature information including a gaussian pyramid comprised of combination pixels from a summing transform performed upon pairs of said current pixels and said neighboring pixels, and a laplacian pyramid comprised of residue pixels from a difference transform performed upon said current pixels and said neighboring pixels, said universal feature information storing only a top level of said gaussian pyramid because other levels of said gaussian pyramid are regenerated by utilizing information from a next-lower level of said laplacian pyramid and a current level of said gaussian pyramid, said universal feature detectors sequentially calculating said original pixels and said neighboring pixels for each level until said subject data at a bottom level of said gaussian pyramid has been recovered; and a processor configured to control said universal feature detector to thereby effectively analyze said subject data.

20. A system for effectively analyzing subject data, comprising:

a universal feature detector configured to generate universal feature information by analyzing said subject data, said universal feature information including one or more multi-scale transforms of said subject data, said universal feature information also including Radon transforms of said subject data, said universal feature information providing a plurality of closely correlated features corresponding to said subject data, said universal feature detectors recovering original pixels from said subject data by utilizing said universal feature information, said original pixels including a series of current pixels and a corresponding series of neighboring pixels, said universal feature information including a gaussian pyramid comprised of combination pixels from a summing transform performed upon pairs of said current pixels and said neighboring pixels, and a laplacian pyramid comprised of residue pixels from a difference transform performed upon said current pixels and said neighboring pixels, said universal feature information storing only a top level of said gaussian pyramid because other levels of said gaussian pyramid are regenerated by utilizing information from a next-lower level of said laplacian pyramid and a current level of said gaussian pyramid, said universal feature detectors sequentially calculating said original pixels and said neighboring pixels for each level until said subject data at a bottom level of said gaussian pyramid has been recovered, said universal feature detector adding said combination pixels and said residue pixels to produce said current pixels, said universal feature detectors subtracting said residue pixels from said combination pixels to produce said neighboring pixels; and a processor configured to control said universal feature detector to thereby effectively analyze said subject data.

21. A method for effectively analyzing subject data, comprising the steps of:

generating universal feature information with a universal feature detector that analyzes said subject data, said universal feature information including one or more multi-scale transforms of said subject data, said multi-scale transforms including at least one multi-level pyramid structure of said universal feature information, said universal feature information also including Radon transforms of said subject data, said universal feature detectors calculating Radon transform lines derived from local histograms corresponding to said multi-level pyramid, said universal feature information providing a plurality of closely correlated features corresponding to said subject data; and controlling said universal feature detector with a processor to thereby effectively analyze said subject data.

22. The method of claim 21 wherein said subject data includes image data, and wherein said universal feature information is utilized to perform an image retrieval procedure based upon corresponding features from said image data to thereby retrieve other image data from a distributed computer network that includes an Internet network.

23. A method for effectively analyzing subject data, comprising the steps of:

generating universal feature information with a universal feature detector that analyzes said subject data, said universal feature information including one or more multi-scale transforms of said subject data, said universal feature information also including Radon transforms of said subject data, said universal feature information providing a plurality of closely correlated features corresponding to said subject data, said universal feature information including an original image, a gaussian pyramid, local histograms derived from said gaussian pyramid, Radon transform lines derived from said local histograms, and a laplacian pyramid derived from said gaussian pyramid; and controlling said universal feature detector with a processor to thereby effectively analyze said subject data.

24. A method for effectively analyzing subject data, comprising the steps of:

generating universal feature information with a universal feature detector that analyzes said subject data, said universal feature information including one or more multi-scale transforms of said subject data, said universal feature information also including Radon transforms of said subject data, said universal feature information providing a plurality of closely correlated features corresponding to said subject data, said universal feature information being utilized to provide a reconstructable original image, local color histograms at various scales corresponding to levels of a gaussian pyramid, local color constancy data, illuminant colors derived from corresponding Radon transform lines, said Radon transform lines also being utilized to shift said illuminant colors of said original reconstructable image; and controlling said universal feature detector with a processor to thereby effectively analyze said subject data.

25. The method of claim 21 wherein said universal feature detectors perform a generalized feature detection process by sequentially performing a preprocessing step, a transform step, a blending step, and a synthesis step.

26. A method for effectively analyzing subject data, comprising the steps of:

generating universal feature information with a universal feature detector that analyzes said subject data, said universal feature information including one or more multi-scale transforms of said subject data, said universal feature information also including Radon transforms of said subject data, said universal feature information providing a plurality of closely correlated features corresponding to said subject data, said universal feature detectors generating a multi-scale gaussian pyramid based upon said subject data by iteratively performing summing transforms, said universal feature detectors also calculating multi-scale histograms corresponding to said multi-scale gaussian pyramid, said universal feature detectors then performing Radon transforms upon said multi-scale histograms to produce and store corresponding Radon transform lines, said universal feature detectors also generating a multi-scale laplacian pyramid from said multi-scale gaussian pyramid by iteratively performing difference transforms; and controlling said universal feature detector with a processor to thereby effectively analyze said subject data.

27. The method of claim 21 wherein said universal feature detectors designate said subject data as a current level of a gaussian pyramid and then select a current pixel in said current level of said gaussian pyramid.

28. The method of claim 27 wherein said universal feature detectors designate a local neighborhood of pixels around said current pixel and then generate a local histogram from said local neighborhood to be stored as part of said universal features information.

29. A method for effectively analyzing subject data, comprising the steps of:

generating universal feature information with a universal feature detector that analyzes said subject data, said universal feature information including one or more multi-scale transforms of said subject data, said universal feature information also including Radon transforms of said subject data, said universal feature information providing a plurality of closely correlated features corresponding to said subject data, said universal feature detectors designating a local neighborhood of pixels around said current pixel and then generating a local histogram from said local neighborhood to be stored as part of said universal features information, said universal feature detectors performing a Radon transform upon said local histogram to thereby generate a corresponding Radon transform line in Radon transform space, said universal feature detectors storing said Radon transform line into said universal feature information with feature data corresponding to said current level of said gaussian pyramid, said universal feature detectors performing a Radon transform upon said local histogram to thereby generate a corresponding Radon transform line in Radon transform space, said universal feature detectors storing said Radon transform line into said universal feature information with feature data corresponding to said current level of said gaussian pyramid; and controlling said universal feature detector with a processor to thereby effectively analyze said subject data.

30. The method of claim 29 wherein said universal feature detectors perform a summing transform upon said current pixel and a neighboring pixel to thereby produce a current combination pixel, said universal feature detectors storing said current combination pixel in a corresponding location in a next-higher level of said gaussian pyramid.

31. The method of claim 30 wherein said universal feature detectors perform said summing transform according to a formula:

Combination Pixel=(Pixel $A$+Pixel $B$)/2 where said Pixel A is said current pixel and said Pixel B is said neighboring pixel.

32. The method of claim 30 wherein said universal feature detectors perform a difference transform upon said current pixel and said neighboring pixel to thereby produce a current residue pixel, said universal feature detectors storing said current residue pixel into a comparable location in a corresponding level of a laplacian pyramid.

33. The method of claim 32 wherein said universal feature detectors perform said difference transform according to a formula:

Residue Pixel=(Pixel $A$−Pixel $B$)/2 where said Pixel A is said current pixel and said Pixel B is said neighboring pixel.

34. The method of claim 32 wherein said universal feature detectors determine whether any unprocessed pixels remain in said current level of said gaussian pyramid, said universal feature detectors returning to select a different unprocessed pixel from said current level of said gaussian pyramid whenever unprocessed pixels remain in said current level of said gaussian pyramid, said different unprocessed pixel then becoming said current pixel, said universal feature detector then repeatedly processing all remaining pixels in said current level of said gaussian pyramid.

35. The method of claim 34 wherein, whenever no unprocessed pixels remain in said current level of said gaussian pyramid, said universal feature detectors then increment said current level of said gaussian pyramid by a value of one to thereby change said current level of said gaussian pyramid to said next-higher level, said universal feature detectors also incrementing said current level of said laplacian pyramid by a value of one to thereby change said current level of said laplacian pyramid to said next-higher level, said universal feature detectors then determining whether said current level of said gaussian pyramid coincide to a top level of said gaussian pyramid, said universal feature detector returning to select a new pixel as said current pixel in said current level for processing whenever said current level of said gaussian pyramid does not coincide to said top level, said universal feature detectors then repeatedly processing all remaining levels of said gaussian pyramid.

36. The method of claim 21 wherein said universal feature detectors utilize a wavelet transform to generate multi-scale information in said universal feature information.

37. The method of claim 21 wherein said universal feature detectors generate saliency features to indicate how important a piece of information from said subject data is in relation to other similar information from said subject data, said universal feature detectors utilizing a thresholding step to remove selectable edges and gradients from image data to thereby produce a sketch image with only salient edge features included.

38. The method of claim 21 wherein said universal feature detectors utilize a feature overlap analysis procedure to determine whether multiple correlated features from said universal feature information redundantly contain similar information, said universal feature detectors then advantageously optimizing said universal feature information to eliminate said similar information.

39. A method for effectively analyzing subject data, comprising the steps of:

generating universal feature information with a universal feature detector that analyzes said subject data, said universal feature information including one or more multi-scale transforms of said subject data, said multi-scale transforms including at least one multi-level pyramid structure of said universal feature information, said universal feature information also including Radon transforms of said subject data, said universal feature information providing a plurality of closely correlated features corresponding to said subject data, said universal feature detectors recovering original pixels from said subject data by utilizing said universal feature information, said original pixels including a series of current pixels and a corresponding series of neighboring pixels, said universal feature information including a gaussian pyramid comprised of combination pixels from a summing transform performed upon pairs of said current pixels and said neighboring pixels, and a laplacian pyramid comprised of residue pixels from a difference transform performed upon said current pixels and said neighboring pixels, said universal feature information storing only a top level of said gaussian pyramid because other levels of said gaussian pyramid are regenerated by utilizing information from a next-lower level of said laplacian pyramid and a current level of said gaussian pyramid, said universal feature detectors sequentially calculating said original pixels and said neighboring pixels for each level until said subject data at a bottom level of said gaussian pyramid has been recovered; and controlling said universal feature detector with a processor to thereby effectively analyze said subject data.

40. A method for effectively analyzing subject data, comprising the steps of:

generating universal feature information with a universal feature detector that analyzes said subject data, said universal feature information including one or more multi-scale transforms of said subject data, said universal feature information also including Radon transforms of said subject data, said universal feature information providing a plurality of closely correlated features corresponding to said subject data, said universal feature detectors recover original pixels from said subject data by utilizing said universal feature information, said original pixels including a series of current pixels and a corresponding series of neighboring pixels, said universal feature information including a gaussian pyramid comprised of combination pixels from a summing transform performed upon pairs of said current pixels and said neighboring pixels, and a laplacian pyramid comprised of residue pixels from a difference transform performed upon said current pixels and said neighboring pixels, said universal feature information storing only a top level of said gaussian pyramid because other levels of said gaussian pyramid are regenerated by utilizing information from a next-lower level of said laplacian pyramid and a current level of said gaussian pyramid, said universal feature detectors sequentially calculating said original pixels and said neighboring pixels for each level until said subject data at a bottom level of said gaussian pyramid has been recovered, said universal feature detector adding said combination pixels and said residue pixels to produce said current pixels, said universal feature detectors subtracting said residue pixels from said combination pixels to produce said neighboring pixels; and controlling said universal feature detector with a processor to thereby effectively analyze said subject data.

41. A computer-readable medium comprising program instructions for effectively analyzing subject data by performing the steps of:

generating universal feature information with a universal feature detector that analyzes said subject data, said universal feature information including one or more multi-scale transforms of said subject data, said multi-scale transforms including at least one multi-level pyramid structure of said universal feature information, said universal feature information also including Radon transforms of said subject data, said universal feature detectors calculating Radon transform lines derived from local histograms corresponding to said multi-level pyramid, said universal feature information providing a plurality of closely correlated features corresponding to said subject data; and controlling said universal feature detector with a processor to thereby effectively analyze said subject data.

42. A system for effectively analyzing subject data, comprising:

means for generating universal feature information for analyzing said subject data, said universal feature information including one or more multi-scale transforms of said subject data, said multi-scale transforms including at least one multi-level pyramid structure of said universal feature information, said universal feature information also including Radon transforms of said subject data, said means for generating universal feature information calculating Radon transform lines derived from local histograms corresponding to said multi-level pyramid, said universal feature information providing a plurality of closely correlated features corresponding to said subject data; and means for controlling said means for generating to thereby effectively analyze said subject data.

* * * * *